United States Patent
Breytman et al.

(10) Patent No.: US 7,083,096 B2
(45) Date of Patent: Aug. 1, 2006

(54) MINIATURE AUTO FOCUS PIEZO ACTUATOR SYSTEM

(75) Inventors: Alex Breytman, Bellmore, NY (US); Mark Krichever, Hauppauge, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 147 days.

(21) Appl. No.: 10/687,280

(22) Filed: Oct. 16, 2003

(65) Prior Publication Data

US 2004/0118921 A1 Jun. 24, 2004

Related U.S. Application Data

(60) Provisional application No. 60/434,519, filed on Dec. 18, 2002.

(51) Int. Cl.
*G06K 7/14* (2006.01)

(52) U.S. Cl. ............... 235/454; 235/462.1; 235/462.23

(58) Field of Classification Search ................ 235/454, 235/462.1, 462.11, 462.23, 462.24
See application file for complete search history.

(56) References Cited

U.S. PATENT DOCUMENTS

| | | | |
|---|---|---|---|
| 4,251,798 A | 2/1981 | Swartz et al. | |
| 5,561,283 A | 10/1996 | Dvorkis et al. | |
| 5,576,529 A | 11/1996 | Koenck et al. | |
| 5,635,697 A | 6/1997 | Shellhammer et al. | |
| 5,798,515 A | 8/1998 | Li et al. | |
| 5,798,516 A * | 8/1998 | Shreesha | 235/462.42 |
| 5,821,522 A | 10/1998 | Li et al. | |
| 5,837,987 A | 11/1998 | Koenck et al. | |
| 6,325,289 B1 | 12/2001 | Mazzone | |
| 6,336,587 B1 | 1/2002 | He et al. | |
| 6,340,114 B1 | 1/2002 | Correa et al. | |
| 6,478,225 B1 | 11/2002 | Swartz et al. | |
| 6,628,445 B1 * | 9/2003 | Chaleff et al. | 359/210 |
| 6,688,525 B1 * | 2/2004 | Nelson et al. | 235/462.21 |
| 6,837,431 B1 * | 1/2005 | Carlson et al. | 235/454 |

* cited by examiner

*Primary Examiner*—Seung H. Lee
(74) *Attorney, Agent, or Firm*—Carter, DeLuca Farrell & Schmidt LLP

(57) ABSTRACT

Actuator systems are provided for automatically focusing an optical image reader. Techniques are also provided which are applicable to the design of imaging engines and imaging lens systems associated with image readers of various types. More specifically, the present invention relates to lens guidance assemblies and actuator systems for automatically focusing an objective lens associated with an imaging system of an optical image reader. The optical image reader is preferably an optical code image reader for imaging optical codes, such as bar codes.

17 Claims, 5 Drawing Sheets

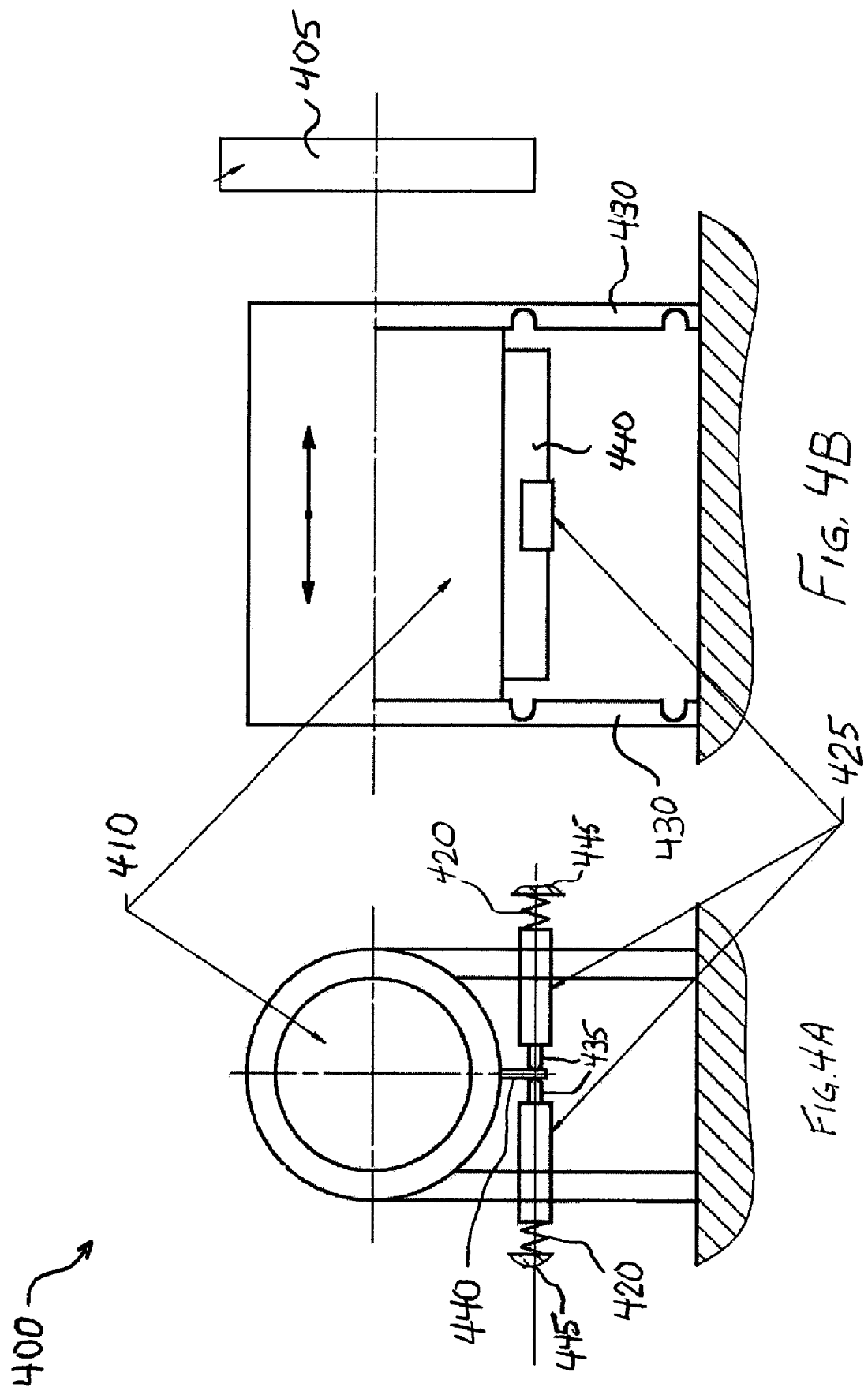

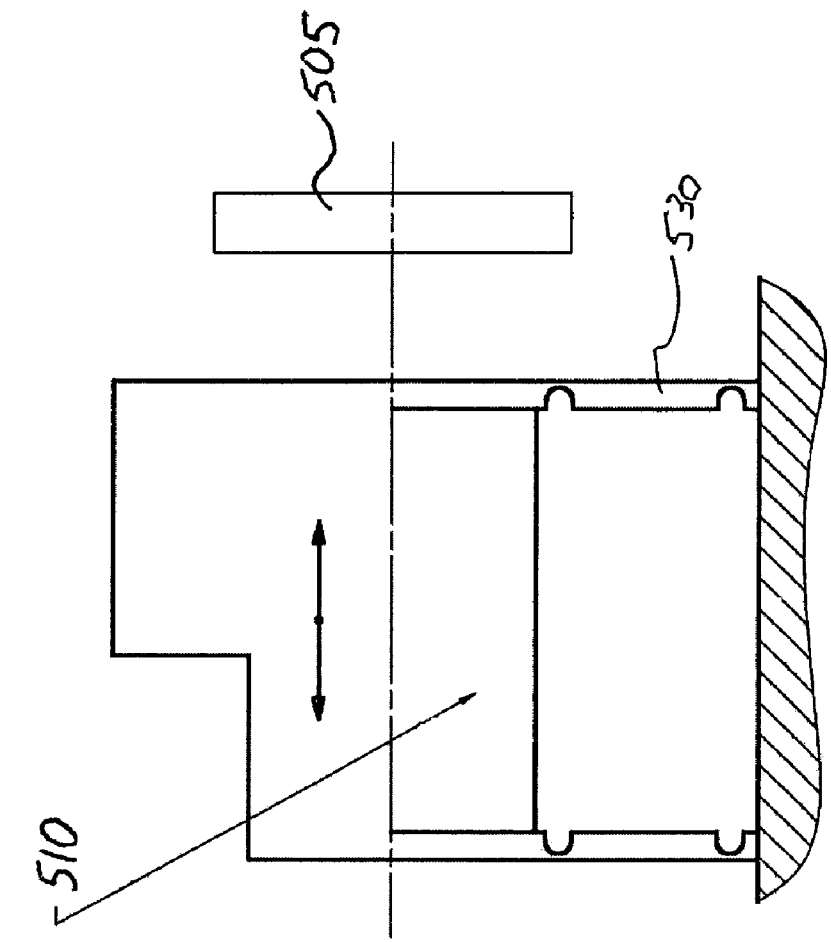
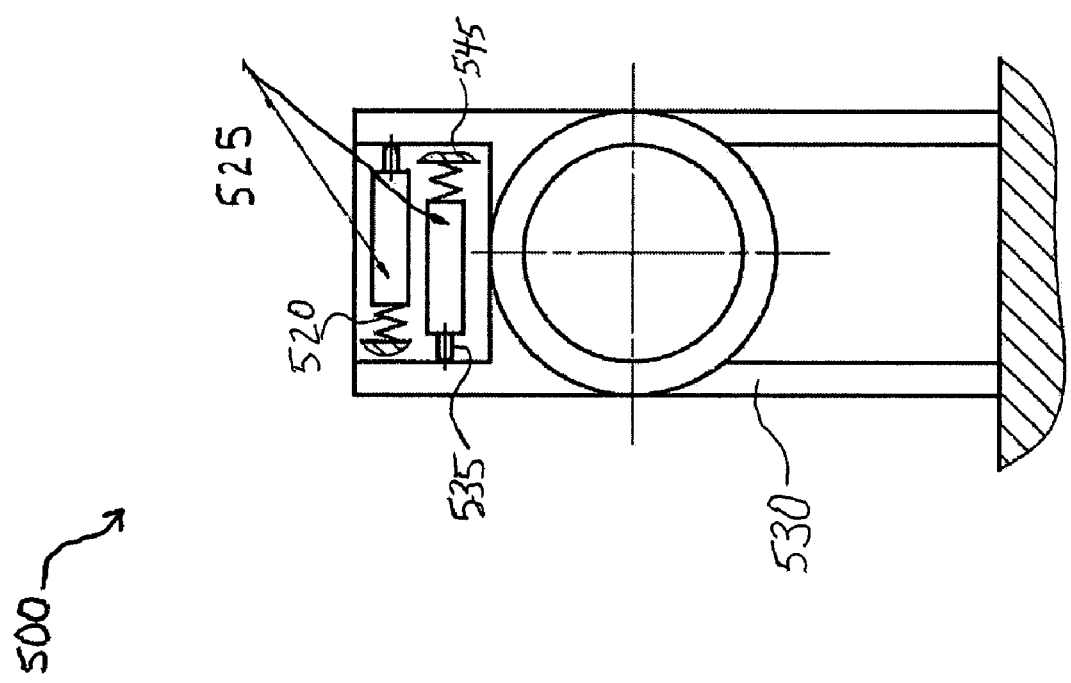
Fig. 5B
Fig. 5A

MINIATURE AUTO FOCUS PIEZO ACTUATOR SYSTEM

PRIORITY

This application claims priority to a U.S. Provisional Application filed on Dec. 18, 2002 and assigned U.S. Provisional Application Ser. No. 60/434,519, the contents of which are incorporated herein by reference.

BACKGROUND OF THE INVENTION

1. Field of the Invention

This invention relates to imaging in optical reading devices, and, more particularly, to actuator systems to automatically focus a target image in an optical reading device. Aspects of the invention are particularly useful in solid state, area image sensor based, handheld image readers which are positioned at variable orientations and distances with respect to a target image.

2. Description of the Related Art

Optical codes are patterns made up of image areas having different light reflective or light emissive properties, which are typically assembled in accordance with a priori rules. The term "barcode" is sometimes used to describe certain kinds of optical codes. The optical properties and patterns of optical codes are selected to distinguish them in appearance from the background environments in which they are used. Devices for identifying or extracting data from optical codes are sometimes referred to as "optical code readers" of which barcode scanners are one type. Optical code readers are used in both fixed and portable installations in many diverse environments such as in stores for check-out services, in manufacturing locations for work flow and inventory control and in transport vehicles for tracking package handling. The optical code can be used as a rapid, generalized means of data entry, for example, by reading a target barcode from a printed listing of many barcodes. In some uses, the optical code reader is connected to a portable data processing device or a data collection and transmission device. Frequently, the optical code reader includes a handheld sensor which is manually directed at a target code.

Most conventional optical scanning systems are designed to read one-dimensional barcode symbols. The barcode is a pattern of variable-width rectangular bars separated by fixed or variable width spaces. The bars and spaces have different light reflecting characteristics. One example of a one dimensional barcode is the UPC/EAN code used to identify, for example, product inventory. An example of a two-dimensional or stacked barcode is the PDF417 barcode. A description of PDF417 barcode and techniques for decoding it are disclosed in U.S. Pat. No. 5,635,697 to Shellhammer et al., and assigned to Symbol Technologies, Inc., which is incorporated herein by reference. Another conventional optical code is known as "MaxiCode." The MaxiCode consists of a central finder pattern or bull's eye center and a grid of hexagons surrounding the central finder. It should be noted that the aspects of the invention disclosed in this patent application are applicable to optical code readers, in general, without regard to the particular type of optical codes which they are adapted to read. The invention described herein is also applicable to image recognition and/or analysis devices.

Most conventional scanning systems generate one or more beams of laser light which reflects off a barcode symbol and back to the scanning system. The system obtains a continuous analog waveform corresponding to the light reflected by the code along one or more scan lines of the system. The system then decodes the waveform to extract information from the barcode. A system of this general type is disclosed, for example, in U.S. Pat. No. 4,251,798, assigned to Symbol Technologies, Inc. and is incorporated by reference herein. A beam scanning system for detecting and decoding one and two dimensional barcodes is disclosed in U.S. Pat. No. 5,561,283, also assigned to Symbol Technologies, Inc. and incorporated by reference herein.

Barcodes can also be read employing imaging devices. For example an image sensor may be employed which has a two dimensional array of cells or photo sensors which correspond to image elements or pixels in a field of view of the device. Such an image sensor may be a two dimensional or area charge coupled device (CCD) and associated circuits for producing electronic signals corresponding to a two-dimensional array of pixel information for a field of view.

Many scanners in use today employ a scanning laser beam. Some such systems are deployed in handheld units which may be manually pointed at the target. Often an individual scanner is a component of a much larger system including other scanners, computers, cabling, data terminals, etc. Such systems are frequently designed and constructed on the basis of mechanical and optical specifications for the scanning engine, sometimes called "form factors". One such form factor is the SE1200 form factor employed by Symbol Technologies, Inc.

Since current form factors specify scanning engines with smaller dimensions, there is a need to provide a compact imaging engine which can be substituted for conventional laser line scanning engines in currently designed and currently deployed optical code reader systems.

There is another need to provide an imaging engine which can be substituted for form factor scanning engines in currently designed and currently deployed optical code reading systems to increase the reliability, versatility and target working range of such systems.

It is known in the art to use a CCD photo detector and objective lens assembly in an optical code reader. In the past, such systems have employed complex objective lens assemblies originally designed for use in relatively expensive video imaging systems. Such lens assemblies typically employ multiple, large diameter, aspheric lens elements. Use of aspheric lens elements and a CCD photo detector in a code reader is illustrated in U.S. Pat. No. 5,703,349. Aspheric lens systems are relatively costly and difficult to build. They also have a single sharp focus and a limited depth of field, which along with conventional aiming, illumination and signal processing and decoding algorithms, limits the versatility and working range of the system.

Symbol Technologies, Inc. has developed bi-stable high speed zone collection systems for barcode scanners. These systems which employ lens structures moveable into the input optical path of the scanner (drop-in optics) are disclosed in U.S. Pat. Nos. 5,798,515 and 5,821,522.

Symbol Technologies, Inc. has also developed an easily constructed and inexpensive objective lens assembly for an imaging optical code reader. This assembly is disclosed in U.S. Pat. No. 6,340,114 B1, the contents of which are incorporated herein by reference. The '114 patent also discloses an optical code reader which can be used to read codes at a wide range of distances. Additionally, the '114 patent also discloses an imaging optical code reader with selectable fields of view and working depths of view appropriate to the signal processing and decoding capabilities of the reader.

However, notwithstanding the advancements made in the art, a need still exists for a system which will be small enough to comply with the most recent form factor specifications while offering the same or higher degree of versatility and performance that may be found in existing systems.

SUMMARY OF THE INVENTION

Thus, to solve the problems in the art, the present invention relates to actuator systems for automatically focusing an optical image reader. Techniques are disclosed which are applicable to the design of imaging engines and imaging lens systems associated with image readers of various types. More specifically, the present invention relates to actuator systems for automatically focusing an objective lens associated with an imaging system.

It is an object of the present invention to provide a compact imaging engine which can be substituted for conventional laser line scanning engines in currently designed and currently deployed optical code reader systems.

It is another object of the present invention to provide an imaging engine which can be substituted for form factor scanning engines in currently designed and currently deployed optical code reading systems to increase the reliability, versatility and target working range of such systems.

It is another object of the present invention to provide an easily constructed and inexpensive moveable objective lens assembly for auto focusing an imaging optical code reader.

It is another object of the present invention to provide several actuator assembly embodiments for moving an objective lens assembly along a lens guidance assembly for auto focusing an imaging optical code reader.

It is another object of the present invention to provide an imaging optical code reader having an imaging engine equipped with an objective lens assembly capable of being moved along a lens guidance assembly for auto focusing the imaging optical code reader.

It is another object of the present invention to provide a moveable objective lens assembly for moving along a lens guidance assembly in accordance with a determined focus quality of the lens assembly for automatically adjusting the focus quality of an imaging optical code reader.

Some or all of the objects previously described may be achieved in a single optical code reading engine or system. With the addition of appropriate control circuitry and data processing software, a system may be constructed serving the object of producing a compact, inexpensively fabricated imaging engine which may be substituted for existing line scan engines. The engine may be adapted for use in many different environments, with various optical fields and focal distances, for reading various codes of different size. The system may also be used for image recognition or analysis, including acquisition of data concerning the target and its environment.

BRIEF DESCRIPTION OF THE DRAWINGS

For a better understanding of the invention, reference is made to the following description of preferred embodiments thereof, and to the accompanying drawings, wherein:

FIGS. 4A and 4B are sectional views of an actuator assembly in accordance with an embodiment of the present invention; and FIGS. 5A and 5B are sectional views of an actuator assembly in accordance with another embodiment of the present invention.

DETAILED DESCRIPTION OF PREFERRED EMBODIMENTS

Figure 1:
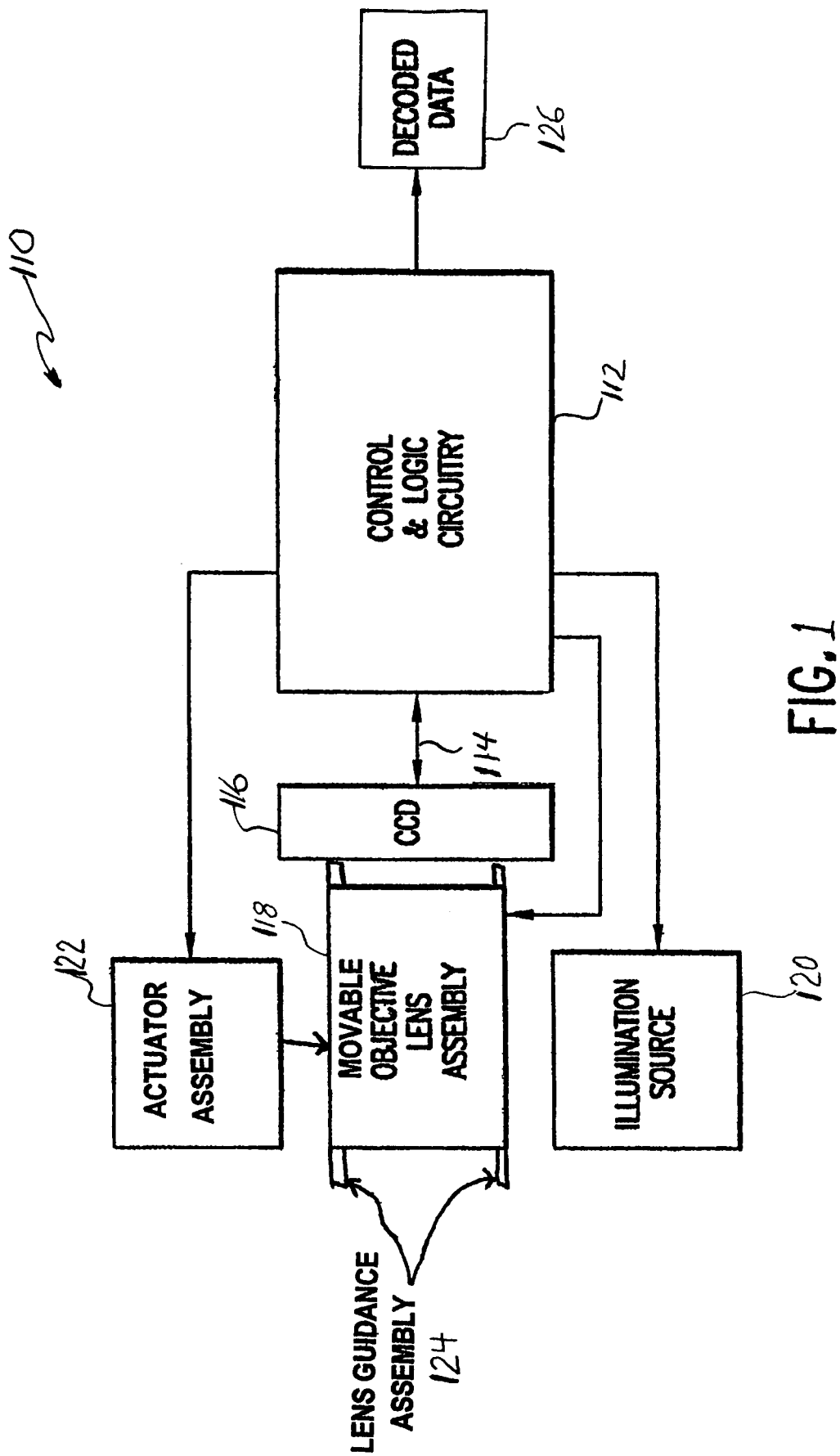
FIG. 1 is a simplified functional block diagram of a preferred embodiment of an imaging engine of the present invention.

Referring now in specific detail to the drawings in which like reference numerals identify similar or identical elements throughout the several views, and initially to FIG. 1, one embodiment of an imaging engine 110 constructed in accordance with the present disclosure is shown. More specifically, FIG. 1 is a functional block diagram of a preferred embodiment of the imaging engine 110 of the present invention illustrating the arrangement of certain components of the imaging engine. The electronic hardware comprising the imaging subsystem and decoding subsystem is represented generally by a block 112, labeled "control and logic circuitry." A double headed arrow 114 illustrates the transmission of signals between an image sensor 116 and the control and logic circuitry 112. Image sensor 116 receives optical image information through an objective lens assembly 118. As further illustrated in FIG. 1, an illumination source 120 and actuator assembly 122 may be controlled by signals provided by the control and logic circuitry 112.

The imaging engine 110 can be decoded (as shown in FIG. 1) or undecoded producing a raw video stream. In the undecoded case, the engine can be sold as a component to be integrated into a device that performs the decoding.

In a preferred embodiment, the image sensor is a charge coupled device (CCD). However, it is to be understood that other area image sensors may be used for the intended purpose, such as CMOS, CMD (charge modulated device) or CID (charge injection device) sensors. Preferred embodiments of the present invention may include circuitry and/or software for processing and decoding image data received from the image sensor 116. An image sensor produces electronic signals typically corresponding to a two-dimensional array of pixel information for a target image. This data is analyzed by circuitry/software based systems to determine black and white threshold information. The pixel data is divided into sub-images, for example, 32×32 pixel sub-images. These sub-images are analyzed for properties known to be associated with various types of optical codes and known to distinguish a particular code from other codes and from environmental (non-code) images.

A lens assembly 118 is provided having at least one lens for focusing light incident on the image sensor 116. The lens assembly 118 is moveable along a lens guidance assembly 124 for changing the back focal length. The objective lens assembly 118 suitable for use in a preferred embodiment of an imaging engine of the present invention may include a cylindrical shaped housing which contains at least one lens element. The lens element may be snap fit in the cylindrical shaped housing to maintain the lens in position on a common optical axis.

In preferred embodiments, the lens assembly 118 is automatically moved between a plurality of positions for automatically focusing an object to be imaged, such as a barcode. Lens guidance assembly 124 guides and supports the lens assembly 118 as it moves to automatically focus the object prior to imaging the object.

Actuator assembly 122 preferably imparts either proximal or distal motion to lens assembly 118 for moving the lens assembly either away from the object or towards the object, respectively. Hence, the amount of movement of the lens assembly 118 depends on the amount of time the actuator assembly 122 is actuated multiplied by the distance the lens assembly 118 moves over a given unit of time (velocity).

Preferably, the actuator assembly 122 is actuated after determining the distance between the imaging apparatus and the object to be imaged. A distance determining method which can be used to determine the distance between the imaging apparatus of the present invention and the object is disclosed in U.S. Pat. No. 6,340,114 B1 which is assigned to Symbol Technologies, Inc. The method involves using an aiming system of the imaging optical code reader to measure the distance to a target image. Other distance determining methods may be used for determining the distance between the imaging apparatus and the object to be imaged such as, for example, the methods disclosed in copending U.S. patent application Ser. No. 10/425,499, filed Apr. 29, 2003, which is incorporated by reference herein.

The determined distance to the object is then correlated by the processing system to a specific or approximate position of the lens guidance assembly 124 with respect to a fixed reference point (e.g., a specific point of the lens guidance assembly, such as the central point).

The processing system in communication with the imaging apparatus then determines the amount of distance the lens assembly needs to be moved to be at the specific or approximate position of the lens guidance assembly with respect to the fixed, reference point. To perform this computation, the processing system takes into consideration the last stored position of the reference point of the lens assembly 118 with respect to the fixed, reference point. The last stored position of the reference point of the lens assembly 118, without taking into consideration the occasional need to calibrate the imaging apparatus by manually or automatically setting the current position of the lens assembly at a known position with respect to the fixed, reference point, equates to the current position of the reference point of the lens assembly 118 with respect to the fixed, reference point.

The last recorded or current position is determined by the processing system by continuously calculating the amount of distance the reference point of the lens assembly 118 moves with respect to the fixed, reference point. For example, after an initial manufacturing setting or calibration of the imaging apparatus, the reference point of the lens assembly 118 is located on the same plane as the fixed, reference point, or at a known distance from the fixed, reference point, e.g., the furthermost possible position from the fixed, reference point.

Thereafter, during operation of the imaging apparatus, the lens assembly 118 is moved along the lens guidance assembly 124 to auto focus the imaging apparatus. The distance moved by the lens assembly either forwards or backwards along an axis during each actuation of the actuator assembly 122 is added or subtracted, respectively, by the processing system to a previously recorded number. For example, if an initial position of the lens assembly 118 is identified as position zero (preferably this initial position equates to the reference point of the lens assembly being located on the same plane as the fixed, reference point) and after actuating the actuation assembly for a predetermined time period for moving the lens assembly +11 mm (i.e., 0.11 mm towards the object to be imaged) with respect to the fixed, reference point, the processing system adds zero and +0.11 to determine the new position of the reference point of the lens assembly as being +0.11 mm from the fixed, reference point. This position is stored by the processing system and is referred to as the last stored position of the reference point of the lens assembly 118 or the current position of the reference point as mentioned above. The predetermined actuation time period of the actuator assembly is determined by the processing system according to how much the lens assembly needs to be moved to auto focus the object based on the determined distance between the imaging apparatus and the object.

At the current position of the lens assembly 118, the object is then imaged by the imaging apparatus and a signal indicative of the imaged object is transmitted to an image processing system capable of executing a series of programmable instructions for identifying the object imaged and/or obtaining information encoded by the imaged object, such as information encoded by a barcode. The image processing system is preferably integrated with the processing system.

After the imaging apparatus is auto focused and the object is imaged, the above-described auto focus imaging process is repeated for a subsequent object to be imaged. That is, upon the initiation of the auto focus imaging process by a user depressing a trigger of the imaging optical code reader or performing some other action, the distance between the imaging apparatus and the object to be imaged is determined by the aiming system in conjunction with the processing system. The processing system then determines the amount of distance the lens assembly 118 is to be moved, either towards or away from the object, from the current position, and accordingly the actuation time period of the actuator assembly. The actuator assembly is then actuated for an amount of time equal to the actuation time period, and the lens assembly 118 is moved by an amount equal to the determined amount for auto focusing the object to be imaged. The object is then imaged.

With continued reference to the previous example, the new position of the reference point of the lens assembly 118 is then stored by the processing system as being +0.11 mm from the fixed, reference point plus the newly moved distance. If the newly moved distance is −0.73 mm (i.e., the lens assembly moved 0.73 mm away from the object to be imaged), then the current position of the reference point of the lens assembly is determined to be −0.62 mm from the fixed, reference point. The newly moved distance is computed by determining that the reference point of the lens assembly 118 must be located at −0.62 mm from the fixed, reference point (i.e., 0.62 mm away from the fixed, reference point in the direction opposite from the location of the object) to maximally auto focus the object to be imaged based on the determined distance between the imaging apparatus and the object.

Further still, the focus quality determination method can be used to auto-discriminate between barcodes and other objects by analyzing the pixel data. Hence, a signal indicating the type of object and other information describing the object can be provided to the image processing system before a full image of the object has been captured, or, in the case where the object is constantly imaged using all of the pixels but only data representative of only a few of the pixels is analyzed, the last captured image or accepted image is provided for image processing.

Additionally, by knowing the type of object, the threshold focus quality range or image resolution can be adjusted "on-the-fly." For example, if the object being imaged is determined to be a bar code, the threshold focus quality can be adjusted to be within a range indicative of low to medium image resolution. If the object being imaged is determined to be a fine-printed number, the threshold focus quality can be adjusted to be within a range indicative of medium to high image resolution. It is contemplated that a numbering system can also be used to quantify the focus quality. For example, the range of one to ten can be used, where the number one is equivalent to extremely poor focus quality or image resolution and the number ten is equivalent to extremely high focus quality or image resolution.

The above-described imaging apparatus may constitute part of an imaging engine which also includes a power supply, decoding circuitry and video controller circuitry. In preferred embodiments, the imaging engine is less than two cubic inches in volume and is dimensioned to replace a moving laser beam imaging engine in a handheld barcode scanner, such as SE900 and SE1200 form factor imaging engines. Such an imaging engine maybe designed to read a variety of types of optical codes including high and low density barcodes at a working range of between 1½ and 18 inches, or more.

More specifically, as shown in FIG. 1, actuator assembly 122 is preferably configured to receive a control signal from the control and logic circuitry 112 and cause movement of objective lens assembly 118. Movement of the objective lens assembly will change the quality of focus of an image at the image sensor 116. More specifically, in operation, the control and logic circuitry 112 may direct the actuator assembly 122 to cause the objective lens assembly 118 to move between a relatively short focal distance and a relatively long focal distance, thereby permitting the imaging engine to be used to read various sized images located at different distances from the imaging engine, while the image remains in focus.

The illumination source 120 may consist of an illumination printed circuit board and a lenslet plate. The illumination printed circuit board may include a plurality of light emitting diodes. In a preferred embodiment, twenty 660 nm laser diodes are arranged on the illuminator board. In an alternative embodiment, laser diodes producing a higher or lower wavelength light may be employed. In either case, the laser diodes are arranged in such a way that the target area is evenly illuminated. In systems where multiple fields of view and multiple focal lengths are selectable in the imaging engine, the illumination system may provide different fields of illumination. Light emanating from the light emitting diodes is projected through apertures or lenslets in a front plate of the imaging engine.

The illumination source may produce a relatively broad beam of lower output intensity to illuminate a target barcode relatively close to the imaging optical code reader, and a relatively narrower beam of higher output intensity to illuminate a target barcode relatively far from the reader. A portion of the illumination source for producing the lower output intensity illumination beam may comprise one or more light emitting elements with a wide divergence pattern located relatively near a principle optical axis of the lens assembly. Additional elements may be used to provide a longer range illumination beam of higher output intensity. In a preferred embodiment, this function is performed by light emitting elements with a narrow divergence pattern located relatively farther from a principle optical axis of the imaging engine. These latter elements may be plural light emitting diodes each associated with a focusing lenslet located in a front face of the imaging engine.

In an illumination system using plural light emitting elements, certain intensity variations may occur across the illuminated field. In preferred embodiments of the present invention, image processing circuits and/or software compensates signals from the image sensor for known variations in illumination provided by the illumination source.

Optical image data is obtained and processed by circuitry and software within the image sensor 116. This data may be in the form of electronic signals corresponding to a two-dimensional array of pixel information for a target image. The data may be stored for subsequent processing in the memory of the control and logic circuitry 112. It will be understood that the processing software may have access to stored image data at all levels. At various processing steps, portions of the image data may be called up for further processing or to confirm on-going analyses.

Figure 2:
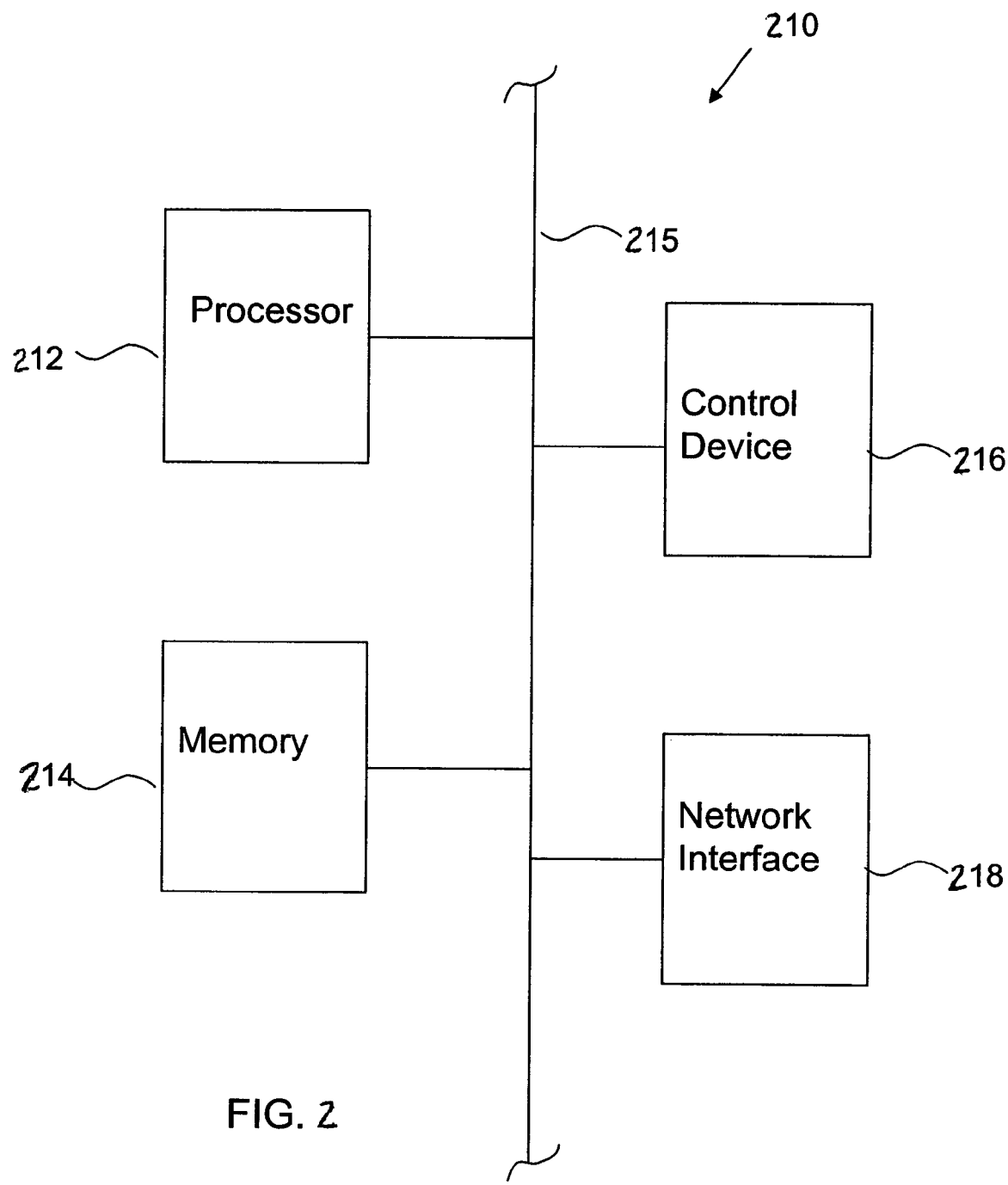
FIG. 2 is a block diagram illustrating a processing device for use in accordance with an embodiment of the present invention.

FIG. 2 shows an example of a processing device 210 that may be used to implement, e.g., a program for determining the distances of the various components described herein. The device 210 includes a processor 212 and a memory 214 which communicate over at least a portion of a set 215 of one or more system buses. Also utilizing at least a portion of the set 215 of system buses are a control device 216 and a network interface device 218. The device 210 may represent, e.g., portions or combinations of the control and logic circuitry 212 or any other type of processing device for use in implementing at least a portion of the process in accordance with the present invention. The elements of the device 210 may correspond to conventional elements of such devices.

For example, the processor 212 may represent a microprocessor, central processing unit (CPU), digital signal processor (DSP), or application-specific integrated circuit (ASIC), as well as portions or combinations of these and other processing devices. The memory 214 is typically an electronic memory, but may comprise or include other types of storage devices, such as disk-based optical or magnetic memory. The control device 216 may be associated with the processor 212. The control device 216 may be further configured to transmit control signals.

The image focusing techniques described herein may be implemented in whole or in part using software stored and executed using the respective memory and processor elements of the device 210. For example, the process for determining the distances of the various components may be implemented at least in part using one or more software programs stored in memory 214 and executed by processor 212. The particular manner in which such software programs may be stored and executed in device elements such as memory 214 and processor 212 is well understood in the art and therefore not described in detail herein.

Figure 3:
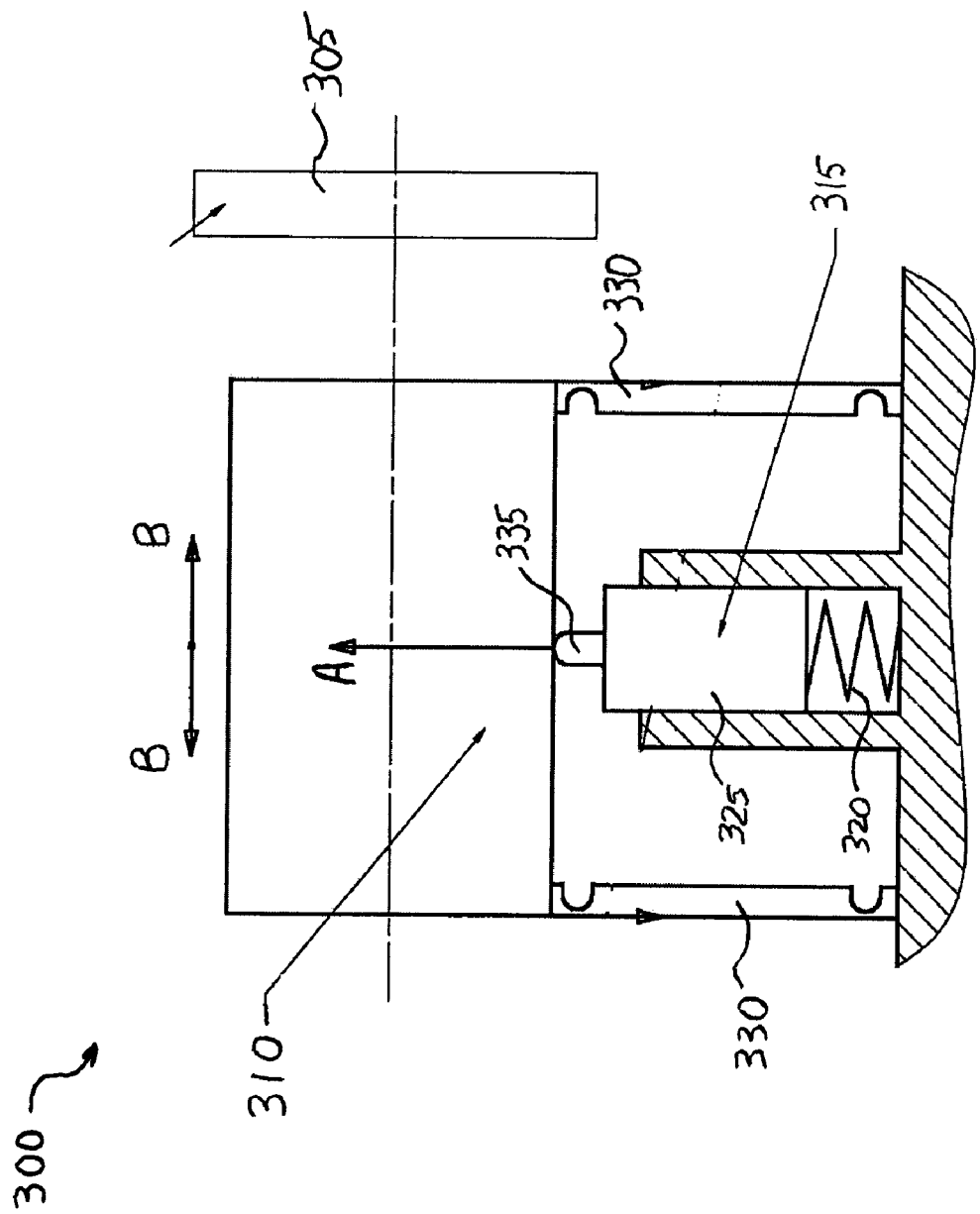
FIG. 3 is a sectional view of a lens and actuator assembly in accordance with an embodiment of the present invention.

Referring now to FIG. 3, an imaging apparatus 300 is illustrated in accordance with a preferred embodiment of the present invention. Imaging apparatus 300 includes an image sensor 305, a lens assembly 310, and a piezo actuator assembly 315. Piezo actuator assembly 315 includes a spring 320 and a piezo actuator 325. As will be described in further detail below, this embodiment relies on movement of the piezo actuator assembly 335 to move lens assembly 310 in a direction which will achieve a desired focus of a target image. Furthermore, the imaging apparatus is configured to move a lens assembly over a total distance of 500 microns with a stop at any point within this distance with an accuracy of +/−10 microns.

Lens assembly 310 is preferably supported by a lens guide system such as, for example, a sliding bushing or living hinges. The lens guide system 330 illustrated in FIG. 3 corresponds to the living hinges described in co-pending U.S. patent application Ser. No. 10/425,344, filed on Apr. 29, 2003, which is incorporated by reference herein. Accordingly, lens guide system 330 provides the necessary support while remaining flexible enough to permit movement of the lens assembly 310 to facilitate focusing of the optical information passing therethrough.

Lens assembly 310 is configured to focus optical information on the image sensor 305. Image sensor 305 produces electronic signals corresponding to an array of pixel information for the target image. As illustrated in FIG. 1, the electronic signals from image sensor 305 are transmitted to control and logic circuitry. The control and logic circuitry process the signals and provide an output signal to the actuator assembly relative to the focus quality of the target image. The method for determining whether the target image is in focus and what the corresponding output signal should be is described in further detail in U.S. patent application Ser. No. 10/389,184, filed on Mar. 14, 2003, which is incorporated by reference herein.

In this embodiment, the actuator assembly referred to in FIG. 1 comprises a piezo actuator assembly 315, as illustrated in FIG. 3. Spring 320 applies a constant force on a proximal end of piezo actuator 325 in the direction toward lens assembly 310 as indicated by arrow A. Accordingly, tip 335 extending from a distal end of piezo actuator 325 is maintained in constant contact with lens assembly 310.

During operation, an output signal from control and logic circuitry is applied to piezo actuator 325 by means known to one having ordinary skill in the art. The reception of the signal by piezo actuator 325 causes piezo actuator 325 to mechanically deform which, in turn, causes movement of tip 335. Since tip 335 is maintained in constant contact with lens assembly 310, any deformation of piezo actuator 325 will translate into movement of lens assembly 310 via tip 335. Preferably, the surface texture of tip 335 is designed such that the coefficient of friction between tip 335 and lens assembly 310 minimizes or eliminates any slippage between the distal end of tip 335 and the surface of lens assembly 310. Furthermore, a variation in the signal being transmitted to piezo actuator 325 will cause piezo actuator 325 to deform differently. Thus, the movement of piezo actuator 325, and therefore the movement of lens assembly 310, may be controlled by varying the control signal. Variations in the signal that will cause the piezo actuator to mechanically deform include, for example, variations in the voltage, current and period. Since lens assembly 310 is held by lens guide system 330, the most prevalent component of the direction of movement will be along the central optical axis in the directions indicated by arrows B—B.

Advantageously, very precise changes may be made to piezo actuator 325 which translate into precise focus adjustments through lens assembly 310. The configuration described with reference to the embodiment illustrated in FIG. 3 provides a fast, accurate and simple method of automatically adjusting the focus of an image viewed through an optical reading device.

Referring now to FIGS. 4A and 4B, an imaging apparatus 400 is illustrated in accordance with another embodiment of the present invention. Imaging apparatus 400 includes an image sensor 405, a lens assembly 410, and at least two piezo actuators 425. First ends of springs 420 are attached to a fixed structure 445, and second ends of springs 420 contact proximal ends of piezo actuators 425. Accordingly, springs 420 apply a force to piezo actuators 425, and tips 435, in a direction towards each other. However, tips 435 are kept separated by a flange 440 which is connected longitudinally to an exterior surface of lens assembly 410.

Movement of lens assembly 410 is caused by a signal transmitted to one or more of the at least two piezo actuators 425. In response to the signal, the piezo actuator will mechanically deform in a manner that will cause movement of the corresponding tip 435. Since tips 435 are in physical contact with flange 440, which is connected along a longitudinal axis of lens assembly 410, movement of tips 435 causes movement of flange 440 and lens assembly 410 in a direction which will achieve a desired focus of a target image.

Lens assembly 410 is preferably supported within a lens guide system 430 such as, for example, a sliding bushing or living hinges. The lens guide system 430 illustrated in FIGS. 4A and 4B are similar to the living hinges of lens guide system 330 described above with reference to FIG. 3. Accordingly, the living hinges of lens guide system 430 provide the necessary support while remaining flexible enough to permit movement of the lens assembly 410 to facilitate focusing of the optical information passing therethrough. The piezo actuators 425 are supported by the fixed structure 445. Advantageously, this configuration eliminates any additional loading on the lens guide system 430 which would otherwise occur if the piezo actuators were supported by the lens guide system. The configuration of the two piezo actuators 425, that is in opposing directions, can have the effect of enhancing or damping the force exerted on the flange 440.

Lens assembly 410 is configured to focus optical information on the image sensor 405. Image sensor 405 produces electronic signals corresponding to an array of pixel information for the target image. As illustrated in FIG. 1, the electronic signals from image sensor 405 are transmitted to control and logic circuitry. The control and logic circuitry process the signals and provide an output signal to an actuator assembly relative to the focus of the target image. The method for determining whether the target image is in focus and what the corresponding output signal should be is described in further detail in U.S. patent application Ser. No. 10/389,184, filed on Mar. 14, 2003, which is incorporated by reference herein.

Referring now to FIGS. 5A and 5B, an imaging apparatus 500 is illustrated in accordance with another embodiment of the present invention. Imaging apparatus 500 includes an image sensor 505, a lens assembly 510, and at least two piezo actuators 525. First ends of springs 520 are attached to a fixed structure 545. Attaching the first ends of springs 520 to fixed structure 545 eliminates any additional loading on the guide assembly 530. Second ends of springs 520 contact a first end of piezo actuators 525. Accordingly, springs 520 apply a force to the first ends of piezo actuators 525. Tips 535 extend from second ends of piezo actuators 525 and contact an upper portion of lens guide assembly 530. Lens guide assembly 530 may be configured as, for example, a sliding bushing or living hinges.

Movement of lens assembly 510 is achieved by transmitting a signal to one or more of the piezo actuators 525. In response to the signal, the piezo actuator will mechanically deform in a manner that will cause movement of the corresponding tip 535. Since tips 535 are in physical contact with an upper portion of lens guide assembly 530, movement of tips 535 will cause movement of lens guide assembly 530 which will, in turn, cause movement of lens assembly 510. The configuration of the embodiment described with reference to FIGS. 5A and 5B allows for a simplified design and manufacturing process, and increased reliability.

Although the illustrative embodiments of the present invention have been described herein with reference to the accompanying drawings, it is to be understood that the invention is not limited to those precise embodiments, and that various other changes and modifications may be affected therein by one having ordinary skill in the art without departing from the scope or spirit of the invention. For example, the optics may include first and second objective lenses having two different fields of view. Accordingly, various modifications and variations can be made without departing from the spirit or scope of the invention as set forth in the following claims both literally and in equivalents recognized in law.

What is claimed is:

1. An imaging apparatus comprising:
   an image sensor for producing electronic signals corresponding to optical information representative of a target image;
   a lens assembly for focusing the target image on the image sensor; and
   at least two piezo actuator assemblies configured in opposing directions and in contact with a longitudinal flange extending from the lens assembly such that movement of tips of the piezo actuator assemblies causes movement of the lens assembly via the flange, wherein the at least two piezo actuator assemblies are configured to each receive a control signal for causing movement of the tips.

2. The imaging apparatus as recited in claim 1, further comprising a lens guidance assembly, wherein the lens assembly is moved along the lens guidance assembly to focus the target image on the image sensor.

3. The imaging apparatus as recited in claim 2, wherein the lens guidance assembly comprises a pair of living hinges.

4. The imaging apparatus as recited in claim 2, wherein the lens guidance assembly comprises a cylindrical bushing.

5. The imaging apparatus as recited in claim 2, wherein the at least two piezo actuator assemblies are in contact with the lens guidance assembly such that movement of the at least one piezo actuator assembly causes movement of the lens assembly.

6. The imaging apparatus as recited in claim 1, wherein the image sensor comprises a charge coupled device.

7. The imaging apparatus as recited in claim 1, wherein the at least two piezo actuator assemblies comprise a piezo actuator, and a spring positioned adjacent a proximal end of the piezo actuator.

8. The imaging apparatus as recited in claim 7, wherein the tip of each of the at least two piezo actuator assemblies extends from a distal end of the piezo actuator and is in contact with the lens assembly such that movement of the tip causes movement of the lens assembly.

9. The imaging apparatus as recited in claim 1, wherein the optical information comprises an array of pixel information.

10. The imaging apparatus as recited in claim 9, wherein the array of pixel information is two-dimensional.

11. The imaging apparatus as recited in claim 1, wherein at least one of the at least two piezo actuator assemblies is positioned adjacent to the lens assembly.

12. The imaging apparatus as recited in claim 1, further comprising control and logic circuitry for processing the electronic signals produced by the image sensor.

13. The imaging apparatus as recited in claim 1, wherein at least one of the at least two piezo actuator assemblies is configured to automatically move the lens assembly to focus the target image on the image sensor.

14. The imaging apparatus as recited in claim 1, wherein the target image is a barcode.

15. The imaging apparatus as recited in claim 1, wherein the imaging apparatus is configured to be less than two cubic inches in volume.

16. The imaging apparatus as recited in claim 1, further comprising an illumination source for illuminating a target area.

17. A method of focusing an image with an imaging apparatus, the method comprising the steps of:
   determining a distance between the imaging apparatus and a target image;
   correlating the determined distance to the target image to a position of a lens guidance assembly;
   determining a current position of a lens assembly with respect to the position of the lens guidance assembly;
   determining an amount of distance that the lens assembly needs to be moved to focus the target image on an image sensor, and
   moving the lens assembly the determined amount of distance, to focus the target image on the image sensor, wherein the lens assembly is moved a determined distance via a piezo actuator assembly to focus the target image on the image sensor.

* * * * *

UNITED STATES PATENT AND TRADEMARK OFFICE
CERTIFICATE OF CORRECTION

PATENT NO. : 7,083,096 B2 Page 1 of 1
APPLICATION NO. : 10/687280
DATED : August 1, 2006
INVENTOR(S) : Alex Breytman and Mark Krichever It is certified that error appears in the above-identified patent and that said Letters Patent is hereby corrected as shown below:

Column 8, Line 54:

"335" should read -- 315 --.

Signed and Sealed this

Twentieth Day of March, 2007

JON W. DUDAS
*Director of the United States Patent and Trademark Office*